United States Patent
Peterson et al.

(10) Patent No.: US 8,624,839 B2
(45) Date of Patent: Jan. 7, 2014

(54) SUPPORT-SURFACE APPARATUS TO IMPART TACTILE FEEDBACK

(75) Inventors: Cody George Peterson, Coeur d'Alene, ID (US); Douglas M. Krumpelman, Hayden, ID (US); Andrew P. Huska, Post Falls, ID (US)

(73) Assignee: Synaptics Incorporated, San Jose, CA (US)

( * ) Notice: Subject to any disclaimer, the term of this patent is extended or adjusted under 35 U.S.C. 154(b) by 23 days.

(21) Appl. No.: 13/153,653

(22) Filed: Jun. 6, 2011

(65) Prior Publication Data

US 2011/0234494 A1 Sep. 29, 2011

Related U.S. Application Data

(60) Provisional application No. 61/429,749, filed on Jan. 4, 2011.

(51) Int. Cl.
*G06F 3/033* (2013.01)
(52) U.S. Cl.
USPC ........... 345/161; 345/162; 345/163; 345/173; 345/174; 340/407.2; 178/18.04; 715/702
(58) Field of Classification Search
USPC .................. 345/161, 163–167, 173, 179; 178/18.01–20.04
See application file for complete search history.

(56) References Cited

U.S. PATENT DOCUMENTS

| | | |
|---|---|---|
| 3,886,341 A | 5/1975 | Forrest |
| 4,334,280 A | 6/1982 | Mcdonald |
| 4,403,123 A | 9/1983 | Shek |
| D278,239 S | 4/1985 | Felix et al. |
| D284,574 S | 7/1986 | Fischer |
| D292,801 S | 11/1987 | Davis, Jr. et al. |
| 4,786,766 A | 11/1988 | Kobayashi |
| 4,885,565 A | 12/1989 | Embach |
| D312,623 S | 12/1990 | Carter et al. |
| 5,121,091 A | 6/1992 | Fujiyama |
| 5,189,390 A | 2/1993 | Fagard |
| 5,212,473 A | 5/1993 | Louis |
| 5,239,152 A | 8/1993 | Caldwell et al. |
| 5,626,223 A | 5/1997 | Lee |

(Continued)

FOREIGN PATENT DOCUMENTS

| | | |
|---|---|---|
| DE | 19704253 A | 8/1998 |
| DE | 10126670 A1 | 12/2002 |

(Continued)

OTHER PUBLICATIONS

Final Office Action mailed Aug. 1, 2012, U.S. Appl. No. 12/580,002, 23 pages.

(Continued)

*Primary Examiner* — Alexander S Beck
*Assistant Examiner* — Amen Bogale
(74) *Attorney, Agent, or Firm* — Ingrassia Fisher & Lorenz P.C.

(57) ABSTRACT

Described herein are techniques related to a support surface (e.g., a mousepad) for imparting a tactile feedback (e.g., haptics) to a human-machine interactive (HMI) device (e.g., a mouse) supported thereon. This Abstract is submitted with the understanding that it will not be used to interpret or limit the scope or meaning of the claims.

15 Claims, 9 Drawing Sheets

(56) References Cited

U.S. PATENT DOCUMENTS

| | | |
|---|---|---|
| 5,667,061 A | 9/1997 | Lee |
| 5,921,382 A | 7/1999 | Retter |
| 5,973,670 A | 10/1999 | Barber et al. |
| 5,977,867 A | 11/1999 | Blouin |
| 5,977,888 A | 11/1999 | Fujita et al. |
| 5,982,304 A | 11/1999 | Selker et al. |
| 6,039,258 A | 3/2000 | Durbin et al. |
| 6,067,081 A | 5/2000 | Hahlganss et al. |
| 6,118,435 A | 9/2000 | Fujita et al. |
| 6,218,966 B1 | 4/2001 | Goodwin et al. |
| 6,219,034 B1 | 4/2001 | Elbing et al. |
| 6,262,717 B1 | 7/2001 | Donohue et al. |
| 6,373,463 B1 | 4/2002 | Beeks |
| 6,392,515 B1 | 5/2002 | Van Zeeland et al. |
| 6,429,846 B2 | 8/2002 | Rosenberg et al. |
| 6,466,118 B1 | 10/2002 | Van Zeeland et al. |
| 6,542,058 B2 | 4/2003 | Van Zeeland |
| 6,677,843 B1 | 1/2004 | Monroe et al. |
| 6,693,626 B1 | 2/2004 | Rosenberg |
| 6,723,937 B2 | 4/2004 | Engelmann et al. |
| 6,819,990 B2 | 11/2004 | Ichinose |
| 6,822,635 B2 | 11/2004 | Shahoian et al. |
| 6,861,603 B1 | 3/2005 | Wang |
| 6,911,901 B2 | 6/2005 | Bown |
| 6,937,124 B1 | 8/2005 | Nakamura et al. |
| 6,982,617 B2 | 1/2006 | Brilon et al. |
| D527,004 S | 8/2006 | Yen |
| 7,106,305 B2 | 9/2006 | Rosenberg |
| 7,113,177 B2 | 9/2006 | Franzen |
| 7,119,798 B2 | 10/2006 | Yoshikawa et al. |
| 7,148,789 B2 | 12/2006 | Sadler et al. |
| 7,166,795 B2 | 1/2007 | Lengeling |
| 7,175,310 B1 * | 2/2007 | Cotterell ............ 362/253 |
| 7,182,691 B1 | 2/2007 | Schena |
| 7,196,688 B2 | 3/2007 | Schena |
| 7,215,329 B2 | 5/2007 | Yoshikawa et al. |
| 7,227,537 B2 | 6/2007 | Nakayama et al. |
| 7,269,484 B2 | 9/2007 | Hein |
| 7,292,227 B2 | 11/2007 | Fukumoto et al. |
| 7,312,791 B2 | 12/2007 | Hoshino et al. |
| 7,324,094 B2 | 1/2008 | Moilanen et al. |
| 7,336,266 B2 * | 2/2008 | Hayward et al. ............ 345/179 |
| 7,339,572 B2 | 3/2008 | Schena |
| 7,342,573 B2 | 3/2008 | Ryynaenen |
| 7,385,308 B2 | 6/2008 | Yerdon et al. |
| 7,400,319 B2 | 7/2008 | Nakayama et al. |
| 7,450,110 B2 | 11/2008 | Shahoian et al. |
| 7,525,415 B2 | 4/2009 | Yatsu et al. |
| 7,548,232 B2 | 6/2009 | Shahoian et al. |
| 7,567,232 B2 | 7/2009 | Rosenberg |
| 7,579,758 B2 | 8/2009 | Maruyama et al. |
| 7,589,607 B2 | 9/2009 | Rochon et al. |
| 7,592,901 B2 | 9/2009 | Furusho |
| 7,592,999 B2 | 9/2009 | Rosenberg et al. |
| 7,602,384 B2 | 10/2009 | Rosenberg et al. |
| 7,607,087 B2 | 10/2009 | Prados |
| 7,791,588 B2 | 9/2010 | Tierling et al. |
| 7,855,715 B1 | 12/2010 | Bowen |
| 7,868,515 B2 | 1/2011 | Krochmal et al. |
| 7,969,288 B2 | 6/2011 | Braun et al. |
| 7,982,720 B2 | 7/2011 | Rosenberg et al. |
| 8,031,181 B2 | 10/2011 | Rosenberg et al. |
| 8,059,105 B2 | 11/2011 | Rosenberg et al. |
| 8,199,033 B2 | 6/2012 | Peterson et al. |
| 8,203,531 B2 | 6/2012 | Peterson et al. |
| 8,248,277 B2 | 8/2012 | Peterson et al. |
| 8,248,278 B2 | 8/2012 | Schlosser et al. |
| 2001/0002648 A1 | 6/2001 | Van Zeeland |
| 2002/0033795 A1 * | 3/2002 | Shahoian et al. ............ 345/156 |
| 2002/0054060 A1 | 5/2002 | Schena |
| 2002/0084721 A1 | 7/2002 | Walczak |
| 2002/0149561 A1 | 10/2002 | Fukumoto et al. |
| 2003/0067449 A1 | 4/2003 | Yoshikawa et al. |
| 2003/0209131 A1 | 11/2003 | Asahi |
| 2004/0252104 A1 | 12/2004 | Nakamura et al. |
| 2005/0017947 A1 | 1/2005 | Shahoian et al. |
| 2005/0134561 A1 | 6/2005 | Tierling et al. |
| 2005/0157893 A1 | 7/2005 | Pelrine et al. |
| 2005/0204906 A1 | 9/2005 | Lengeling |
| 2005/0237309 A1 | 10/2005 | Sharma |
| 2006/0109256 A1 | 5/2006 | Grant et al. |
| 2006/0113880 A1 | 6/2006 | Pei et al. |
| 2006/0187201 A1 | 8/2006 | Rosenberg et al. |
| 2006/0256075 A1 | 11/2006 | Anastas et al. |
| 2006/0261983 A1 | 11/2006 | Griffin et al. |
| 2006/0279538 A1 | 12/2006 | Chang et al. |
| 2006/0290662 A1 | 12/2006 | Houston et al. |
| 2007/0031097 A1 | 2/2007 | Heikenfeld et al. |
| 2007/0080951 A1 | 4/2007 | Maruyama et al. |
| 2007/0091070 A1 | 4/2007 | Larsen et al. |
| 2007/0146317 A1 | 6/2007 | Schena |
| 2007/0146334 A1 | 6/2007 | Inokawa |
| 2007/0152974 A1 | 7/2007 | Kim et al. |
| 2007/0193436 A1 | 8/2007 | Chu |
| 2007/0234887 A1 | 10/2007 | Sawada et al. |
| 2007/0234890 A1 | 10/2007 | Yamashita |
| 2007/0236449 A1 | 10/2007 | Lacroix et al. |
| 2007/0236450 A1 | 10/2007 | Colgate et al. |
| 2008/0083314 A1 | 4/2008 | Hayashi et al. |
| 2008/0084384 A1 | 4/2008 | Gregorio et al. |
| 2008/0092720 A1 | 4/2008 | Yamashita et al. |
| 2008/0100568 A1 | 5/2008 | Koch et al. |
| 2008/0129705 A1 * | 6/2008 | Kim et al. ............ 345/174 |
| 2008/0197901 A1 | 8/2008 | Cruz-Hernandez et al. |
| 2008/0289952 A1 | 11/2008 | Pelrine et al. |
| 2008/0302647 A1 | 12/2008 | Villain et al. |
| 2008/0303782 A1 | 12/2008 | Grant et al. |
| 2009/0002205 A1 | 1/2009 | Klinghult et al. |
| 2009/0046069 A1 | 2/2009 | Griffin et al. |
| 2009/0072662 A1 | 3/2009 | Sadler et al. |
| 2009/0128501 A1 | 5/2009 | Lazaridis et al. |
| 2009/0178913 A1 | 7/2009 | Peterson et al. |
| 2009/0189790 A1 | 7/2009 | Peterson et al. |
| 2009/0189873 A1 | 7/2009 | Peterson et al. |
| 2009/0210568 A1 | 8/2009 | Peterson et al. |
| 2009/0231277 A1 | 9/2009 | Peterson et al. |
| 2009/0255793 A1 | 10/2009 | Krochmal et al. |
| 2010/0109486 A1 | 5/2010 | Polyakov et al. |
| 2010/0171715 A1 | 7/2010 | Peterson et al. |
| 2010/0231423 A1 | 9/2010 | Yang |
| 2011/0096013 A1 | 4/2011 | Krumpelman et al. |
| 2011/0107958 A1 | 5/2011 | Pance et al. |
| 2011/0128239 A1 * | 6/2011 | Polyakov et al. ............ 345/173 |
| 2011/0148607 A1 | 6/2011 | Zeleny |
| 2011/0227763 A1 | 9/2011 | Schlosser et al. |
| 2011/0227872 A1 | 9/2011 | Huska et al. |
| 2012/0043191 A1 | 2/2012 | Kessler et al. |
| 2012/0092263 A1 | 4/2012 | Peterson et al. |
| 2012/0169603 A1 | 7/2012 | Peterson et al. |

FOREIGN PATENT DOCUMENTS

| | | |
|---|---|---|
| DE | 2005002417 A | 4/2005 |
| DE | 2004005501 A | 8/2005 |
| EP | 0278916 A | 8/1988 |
| EP | 1310860 A | 5/2003 |
| EP | 1548776 A | 6/2005 |
| JP | 2007173087 A | 7/2007 |
| JP | 2011233406 A | 11/2011 |
| WO | 0191100 A | 11/2001 |
| WO | 02073587 A | 9/2002 |
| WO | 2009043605 A | 4/2009 |
| WO | 2009067708 A1 | 5/2009 |
| WO | 2009097358 A | 8/2009 |
| WO | 2009097359 A | 8/2009 |
| WO | 2009097361 A2 | 8/2009 |
| WO | 2009114827 A | 9/2009 |

OTHER PUBLICATIONS

Non-Final Office Action mailed May 14, 2012, U.S. Appl. No. 13/323,292, 19 pages.

Notice of Allowance and Fees Due mailed Jun. 8, 2012, U.S. Appl. No. 12/371,301, 27 pages.

(56) References Cited

OTHER PUBLICATIONS

United States Patent and Trademark Office, US Non-final Office Action for U.S. Appl. No. 12/975,733 dated Oct. 25, 2013.
"Elastomers: Powerful Polymer", Retrieved from <http://appliancedesign.com/copyright/>, (Jun. 2006),5 pages.
"Haptic Touch Technology", Pacinian,(Nov. 2007),2 pages.
"Haptics: Learning Through Touch", Retrieved from <http://ced.ncsu.edu/nanoscale/haptics.htm>, (2004),5 pages.
International Search Report and Written Opinion, Application No. PCT/US2010/020380, (Apr. 12, 2010),10 pages.
"Nanoactuators Based on Electrostatic Forces on Dielectrics", Retrieved from <http://www.nasatech.com/Briefs/Apr05/NPO30747.html>on Nov. 28, 2005, NASA's Jet Propulsion Laboratory, Pasadena, CA,4 pages.
"New SRI International sSpin-Off, Artificial Muscle, Inc., Secure Series a Funding from Leading VC Firms", Retrieved from <http://www.sri.com/news/releases/05-03-04.html> on Jan. 30, 2008, SRI International Spin Offs Artificial Muscle, Inc,(May 2004),2 pages.
Non-Final Office Action mailed Dec. 9, 2011, U.S. Appl. No. 12/580,002, 21 pages.
"Proposed Experiment Protocol and Details", Retrieved from <http://bdml.stanford.edu/twiki/bin/view/Haptics/ProposedExperi0mentPr- otocolAndDetails>, 5 pages.
"Tactile Perception and Design", Retrieved from http://www.tireesias.org/reports.tpd2.htm on Apr. 4, 2006, 10 pages.
"Touch and Haptics", 2004 IEEE/ RSJ International Conference on Intelligent Robots and Systems, (Sep. 28, 2004),32 pages.
"Touch-Hapsys", Retrieved from <http://www.touch-hapsys.org>, 2 pages.
Ashley, Steven "Artificial Muscles", Scientific American, Available at <www.sciam.com>,(Oct. 2003),pp. 53-59.
Bar-Cohen, Y. "Electroactive Polymer (EAP) Actuators as Artificial Muscles—Reality, Potential and Challenges", SPIE Press, (Mar. 18, 2004),pp. 26 and 548-550.
Bar-Cohen, Yoseph "Electric Flex", IEEE Spectrum Online, (Jun. 2004),6 pages.
Bar-Cohen, Yoseph "Electroactive Polymers as Artificial Muscles-Capabilities, Potentials and Challenges", Robotics 2000, Available at <www.spaceandrobotics>,(Feb. 28-Mar. 2, 2000),pp. 1-8.
Bar-Cohen, Yoseph "Electroactive Polymers", Retrieved from <http://electrochem.cwru.edu/ed/encycl/>, Electrochemistry Encyclopedia, (Dec. 2004),7 pages.
Bar-Cohen, Yoseph "Low Mass Muscle Actuators (LoMMAs)", Telerobotic Task Sponsored by NASA HQ, Code S, (Oct 23, 1997),18 pages.
Bar-Cohen, Yoseph "Worldwide Electroactive Polymers", (Artificial Muscles) Newsletter, vol. 7, No. 2, Available at <http://eap.jpl.nasa.gov>,(Dec. 2005),pp. 1-16.
Bar-Cohen, Yoseph et al., "Enabling Novel Planetary and Terrestrial Mechanisms Using Electroactive Materials at the JPL's NDEAA Lab", Retrieved from http://ndeaa.jpl.nasa.gov>, pp. 1-6.
Bark, Karlin "Functional Prototype I", Retrieved from <http://bdml.stanford.edu/twiki/bin/view/Haptics/FunctionalPrototypeI?-skin=print.pattern>, (Aug. 9, 2005),3 pages.
Beavers, Alex "Basic Concepts for Commercial Applications of Electroactive Polymer Artificial Muscle", Artificial Muscle Incorporated, Menlo Park, CA,10 pages.
Bicchi, Antonio et al., "Haptic Illusions Induced by the Tactile Flow", Interdepartmental Research Centre "E. Piaggo", University of Pisa,12 pages.
Bifano, Thomas "Parallel Plate Electrostatic Actuation for High-Resolution Deformable Mirrors", Boston University, (Aug. 19, 2004),35 pages.
Biggs, James "Some Useful Information for Tactile Display Design", IEEE Transactions on Man-Machine Systems, vol. 11, No. 1,(1970),pp. 19-24.
Carpi, Federico et al., "Dielectric Elastomers as Electromechanical Transducers: Fundamentals, Materials, Devices, Models and Applications of an Emerging Elecrotactive Polymer Technology", Elsevier Ltd., (2008),12 pages.
Fontaine, Ebraheem "A Laboratory Demonstration of a Parallel Robotic Mechanism", Massachusetts Institute of Technology,(Jun. 2002),pp. 1-14.
Gorinevsky, Dimitry "Adaptive membrane for large lightweight space telescopes", SPIE Astronomical Telescopes and Instrumentation,(2002),pp. 1-9.
Hayward, Vincent et al., "Tactile Display Device Using Distributed Lateral Skin Stretch", Proceedings of the Haptic Interfaces for Virtual Environment and Teleoperator Systems Symposium, ASME International Mechanical Engineering Congress & Exposition,(2000),pp. 1309-1314.
Hollis, Ralph "Haptics", Berkshire Encyclopedia of Human-Computer Interaction, Berkshire Publishing Group,(2004), pp. 311-316.
Jager, Edwin et al., "Microfabricating Conjugated Polymer Actuators", Science Magazine, vol. 290, www.sciencemag.org,(Nov. 24, 2000),pp. 1540-1544.
Jones, Gail et al., "A Comparison of Learning with Haptic and Visual Modalities", National Science Foundation REC-0087389,pp. 1-20.
Jones, Lynette "Human Factors and Haptic Interfaces", Department of Mechanical Engineering, Massachusetts Institute of Technology,40 pages.
Jungmann, M., et al, Miniaturised Electrostatic Tactile Display with High Structural Compliance, 2002, 6 pages.
Kajimoto, Hiroyuki et al., "Electro-Tactile Display with Tactile Primary Color Approach", Graduate School of Information and Technology, The University of Tokyo,2 pages.
Mok Ha, Soon et al., "Interpenetrating Polymer Networks for High-Performance Electroelastomer Artificial Muscles", Department of Materials Science and Engineering, UCLA,pp. 1-19.
Non-Final Office Action mailed Feb. 13, 2009, U.S. Appl. No. 11/945,879.
Odell, D.L. et al., "MicroRobot Conveyance and Propulsion System Using Comb Drive and Parallel Plate Actuators: The ScuttleBot", UC Berkley,4 pages.
O'Halloran, A et al., "Materials and Technologies for Artificial Muscle: A Review for the Mechatronic Muscle Project", Topics in Bio-Mechanical Engineering, Chapter 7, Department of Electronic Engineering, National University of Ireland Galway,(2004),pp. 184-215.
Pasquero, Jerome "Stimulation of the Fingertip by Lateral Skin Strech", Retrieved from <http://www.cim.mcgill.ca/.about.jay/index.sub.-files/research.htm>- ;, 5 pages.
Pasquero, Jerome "Stress: A Tactile Display Using Lateral Skin Stretch", Department of Electrical and Computer Engineering McGill University, Montreal,(Oct. 2003),75 pages.
Pasquero, Jerome "Survey on Communication Through Touch", Technical Report: TR-CIM 06.04, Center for Intelligent Machines Department of Electrical and Computer Engineering,(Jul. 2006),pp. 1-27.
Pasquero, Jerome "Tactile Display Survey", Technical Report TR-CIM 06.04,6 pages.
Pei, Qibing et al., "Multiple-Degrees-of-Freedom Electroelastomer Roll Actuators", SRI International Institute of Physics Publishing, (2004),pp. N86-N92.
Raisamo, Roope "Tactile User Interfaces", New Interaction Techniques,(Aug. 2, 2001),30 pages.
Seeger, Joseph et al., "Dynamics and Control of Parallel-Plate Actuators Beyond the Electrostatic Instability", Transducers "99 The 10th International Conference on Solid State Sensors and Actuators, (Jun. 1999),pp. 474-477.
Sommer-Larsen, Peter "Artificial Muscles", Rise National Laboratory, Condensed Matter Physics and Chemistry Department,3 pages.
Spires, Shelby "Artificial Strongman", Smart Business: For the New Economy, (Nov. 2000),1 page.
Srinivasan, Mandayam A., et al, "Role of Skin Biomechanics in Mechanoreceptor Response", Retrieved from <http://touchlab.mit.edu/oldresearch/currentwork/humanhaptics/roleofsk- inbiomechanics/> on Dec. 20, 2007, MIT Touch Lab, (Dec. 20, 2007),pp. 1-13.
Supplemental Notice of Allowance mailed May 20, 2010, U.S. Appl. No. 11/945,879, 5 pages.
Wagner, Christopher et al., "Integrating Tactile and Force Feedback with Finite Element Models", Division of Engineering and Applied Sciences, Harvard University,6 pages.

(56) References Cited

OTHER PUBLICATIONS

Wagstaff, Jeremy, "A Passion for the Keys", The Wall Street Journal Online, Nov. 23, 2007, 3 pages, retrieved from the Internet at online.wsj.com/article_print/SB119578337324301744.html.

Wing, Alan et al., "Multidimensional Haptics Preliminary Report", Retrieved from <http://www.touch-hapsys.org>, (Sep. 21, 2003),pp. 1-125.

Wingert, Andreas et al., "On the Kinematics of Parallel Mechanisms with Bio-stable Polymer Actuators", Department of Mechanical Engineering, Massachusetts Institute of Technology Cambridge,8 pages.

Wu, Xingtao et al., "A Generalized Capacitance-Based Model for Electrostatic Micro-Actuators", Department of Physics, New Jersey Institute of Technology, Newark, NJ, 07102-1982 Department of Mechanical Engineering, Columbia University, NY 10027, pp. 1-23.

Yang, Gi-Hun, "Novel Haptic Mouse System for Holistic Haptic Display and Potential of Vibrotactile Stimulation", Human-Robot Interaction Research Center, Korea Advanced Institute of Science and Technology, 2005, 17 pages.

Zou, Jun et al., "Design of a Wide Turning Range Micromachined Tumable Capacitor for Wireless Communications", First IEEE Electro/Information Technology Conference, Jun. 8-11, Chicago, IL, 2000, 6 pages.

Bifano, Thomas, "Parallel Plate Electrostatic Actuation for High-Resolution Deformable Mirrors", Boston University, Boston, MA, Aug. 19, 2004.

Fukumoto, Masaki, et al, "Active Click: Tactile Feedback for Touch Panels", NTT DoCoMo Multimedia Labs, Mar. 31, 2001, 2 pages.

MacKenzie, Scott, et al, "The Tactile Touchpad", 1997, 5 pages.

MacKenzie, Scott, et al., "A Comparison of Three Selection Techniques for Touchpads", Proceedings of the CHI'98 Conference on Human Factors in Computing Systems, pp. 336-343 New York 1998.

Oniszczak, Aleks, "VersaPad Driver Plus Pack", 1999, 3 pages.

Poupyrev, Ivan, et al., "Tactile Interfaces for Small Touch Screens", 2003, 4 pages.

Poupyrev, Ivan, et al., "TouchEngine: A Tactile Display for Handheld Devices", 2002, 2 pages.

\* cited by examiner

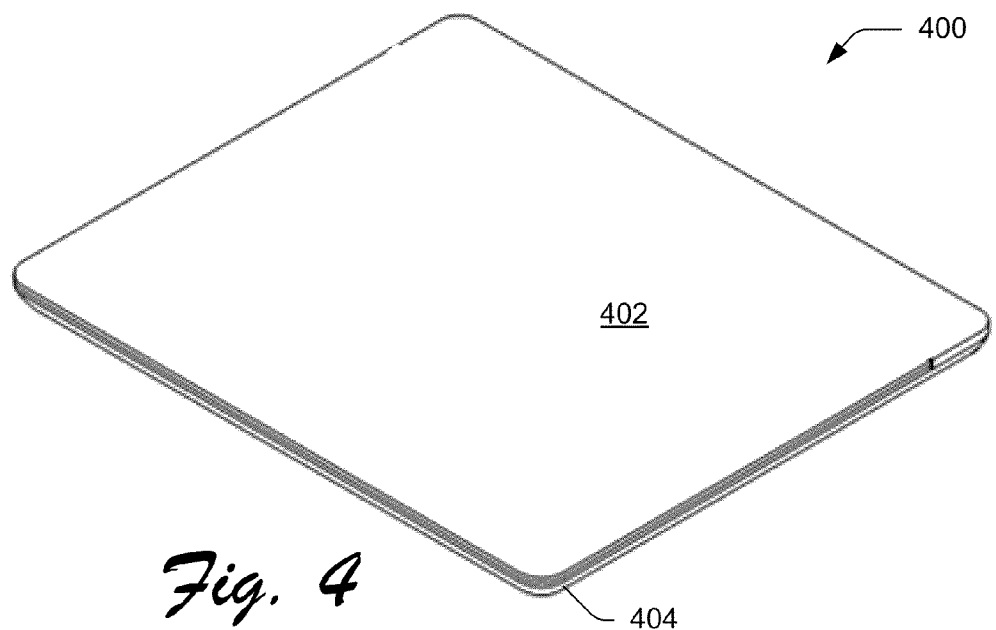
Fig. 4
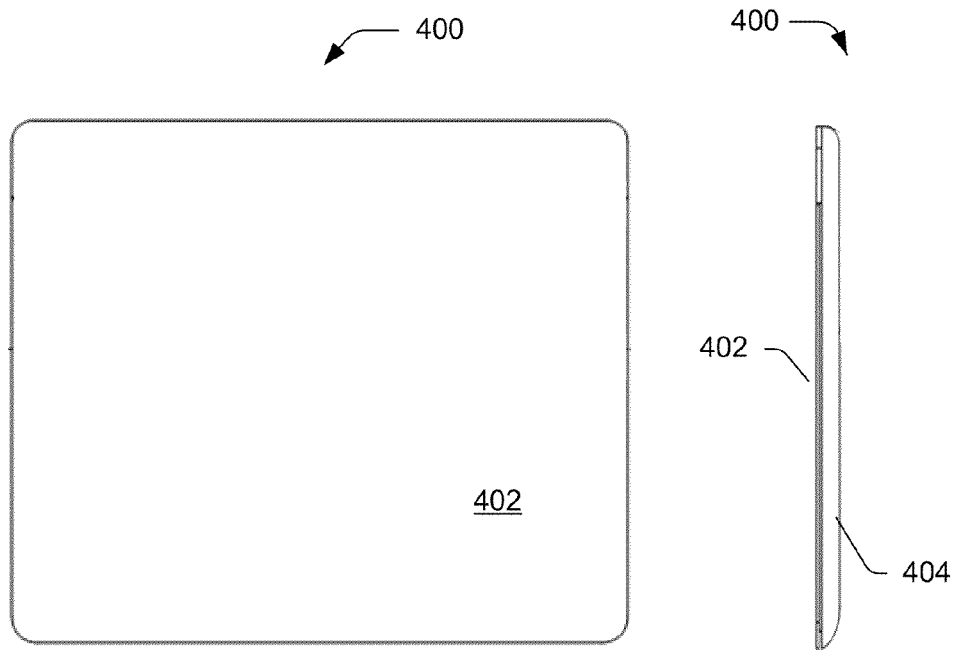
Fig. 5
Fig. 6

SUPPORT-SURFACE APPARATUS TO IMPART TACTILE FEEDBACK

RELATED APPLICATION

This application incorporates by reference the disclosure of U.S. Non-Provisional patent application Ser. No. 12/580,002, filed on Oct. 15, 2009. In addition, this application incorporates by reference the disclosure of U.S. Provisional Patent Application Ser. No. 61/429,749, filed on Jan. 4, 2011.

BACKGROUND

In order to provide tactile feedback (e.g., haptics) to a user of a computing system, conventional approaches incorporate electro-mechanics into the device providing the physical human-to-machine interface to the system. Examples of such human-to-machine interface devices include gaming controllers (e.g., joysticks and steering wheel) and computer input devices (e.g., keyboard and touchscreens). In order to use tactile feedback with the conventional approaches, such a device must be specifically designed with the tactile-feedback actuation mechanism built into the device.

SUMMARY

Described herein are techniques related to an apparatus with a support surface for imparting a tactile feedback to a human-machine interactive (HMI) device supported thereon. In one example scenario, a user of a conventional HMI device (such as a mouse) may feel tactile feedback from the mouse while playing a computer game on a computing system. Instead of the mouse generating the tactile feedback, a support-surface apparatus (such as a mousepad), upon which the mouse rests, generates the tactile feedback that the user feels while using the mouse. The host computer may generate a signal (such as an audio signal) that drives, at least in part, the feedback generated by the mousepad.

This Summary is submitted with the understanding that it will not be used to interpret or limit the scope or meaning of the claims. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4-6 are three different views of a third implementation of a tactile-feedback imparting support-surface apparatus that is configured in accordance with the techniques described herein.

FIG. 4 is an isometric view of the third implementation of the tactile-feedback imparting support-surface apparatus.

FIG. 5 is top plan view of the third implementation of the support-surface apparatus.

FIG. 6 is a side elevation view of the third implementation of the support-surface apparatus.

The Detailed Description references the accompanying figures. In the figures, the left-most digit(s) of a reference number identifies the figure in which the reference number first appears. The same numbers are used throughout the drawings to reference like features and components.

DETAILED DESCRIPTION

Figure 1:
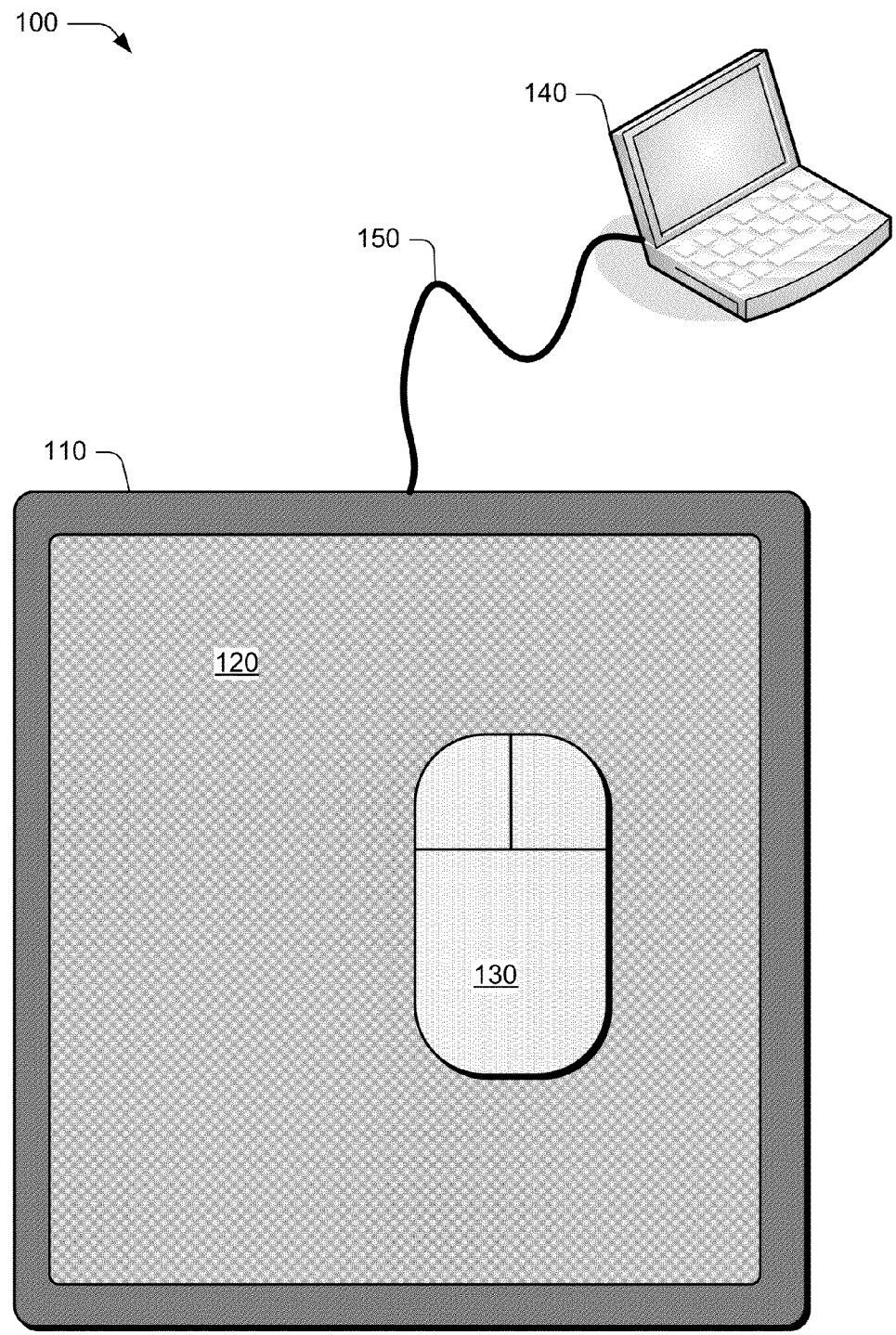
FIG. 1 is top plan view that illustrates a first implementation of a tactile-feedback imparting support-surface apparatus that is configured in accordance with the techniques described herein.

Described herein are one or more techniques related to tactile feedback (e.g., haptic) technologies. Described herein are techniques related to a support-surface apparatus (such as a mousepad) for imparting a tactile feedback to a human-to-machine interface device (such as a mouse) supported thereon. Such devices are also called human-machine interactive (HMI) devices.

As described herein, the technologies include a movement-effecting mechanism designed to provide tactile feedback via a support-surface apparatus, typically, in response to a signal (e.g., audio signal or a data stream, which could be one and the same as can be appreciated by modern computer technologists) produced by a host computing system. As part of the tactile feedback, the support surface of the device may move. That movement is in one or more directions that are towards and/or away from the support surface (i.e., orthogonal direction). Often, that direction is also towards and/or away from the user.

The imparted movement of the tactile feedback is typically orthogonal (i.e., in the Z-direction) to the planar (i.e., in the X and/or Y directions). Because of this, the tactile feedback does not interfere with the accurate X/Y position tracking of a mouse. That is, the mouse still performs reliably despite the tactile feedback being imparted to it. Conventional haptic technologies, which use vibration of, for example, an offset motor, interferes with the accurate X/Y position tracking of the mouse.

As described herein, the movement-effecting mechanism is an actuator mechanism that is operatively associated with the support-surface apparatus to provide tactile feedback to the user of a HMI device supported on that support surface. The actuator mechanism accomplishes that feedback, at least in part, by the movement of at least one of a pair of spaced-apart planes, which are permitted to move relative to each other. In so doing, the actuator mechanism also moves the surface in some of the described examples. In at least some described instances, the planes have conductive properties.

In some of the described instances, the pair of planes (with conductive properties) is suitably driven to provide movement of at least one of the planes through attractive and/or repellant forces. Any suitable type of material can be used for the conductive planes. For example, the conductive planes can be formed as part of a transparent or translucent plane (e.g., glass or plastic). Alternately or additionally, the conductive planes can be formed from material that is not transparent (e.g., a metal material).

Some of the described techniques include those utilizing a return mechanism that is designed to return the pair of planes, after a movement of the planes relative to each other, back to their original spaced-apart position relative to each other, thereby restoring the defined gap therebetween. In so doing, the return mechanism also returns the support surface back to its original position, in some of the described examples. In some of the described instances, the return mechanism includes at least one spring.

Consider an exemplary scenario where a user is playing a computer game using a conventional mouse. The user is moving his mouse on an exemplary mousepad that employs the new tactile-feedback imparting techniques described herein. The audio output from the computer game may be piped to the exemplary tactile-feedback imparting mousepad. Alternatively, a specially programmed audio channel may be piped to the exemplary mousepad. Alternatively still, other non-audio signals may be used to drive the tactile feedback. For example, a signal may include specific code that is interpreted by the tactile feedback controller to provide specific feedback profiles.

The exemplary mousepad may or may not filter the piped audio signal. In response to the filtered and/or piped audio signal, the exemplary mousepad may generate tactile feedback. Since the mouse is resting on the mousepad, the user feels the feedback through the mouse as he holds and moves it.

In this exemplary scenario, the tactile feedback may be generated by movement of one or more conductive planes inside the mousepad. That movement is caused by changes in the electrostatic forces between at least a pair of conductive planes and the changes in electrostatic forces is driven, at least in part, by an electrical signal based upon an audio or other drive signal.

The implementations of the new techniques described herein may be referred to as an "exemplary tactile-feedback imparting support-surface apparatus" or just "exemplary support-surface apparatus." While one or more example embodiments are described herein, the reader should understand that the claimed invention may be practiced using different details than the exemplary ones described herein.

Exemplary Implementations of Tactile-Feedback Imparting Support Surface

FIG. 1 shows an exemplary scenario 100 where a first implementation of a tactile-feedback imparting support-surface apparatus 110 may be employed. The support-surface apparatus 110 includes a support veneer 120 configured to support a human-machine interaction (HMI) device. The support veneer is the actual surface that supports the HMI device. In particular, the support veneer 120 depicted in FIG. 1 is a mousing veneer and the HMI device resting thereon is a wireless mouse 130. The particular implementation of the tactile-feedback imparting support-surface apparatus 110 shown in FIG. 1 is a mousepad.

The support-surface apparatus 110 is operatively coupled to a computing system 140 via a wired connection 150 (e.g., Universal Serial Bus (USB)). Of course, alternatively or in addition, the support-surface apparatus 110 maybe operatively coupled to the computing system 140 via a wireless connection (e.g., Bluetooth™).

A conventional mousepad is typically composed of one or more layers of solid material, such as rubber composites, fabric, plastics, neoprene, silicone, leather, glass, cork, wood, metal, and/or stone. A user typically uses a mousepad because it offers an unobstructed and possibly cushioned area for mousing with a textured and/or non-reflective surface to enhance usability of mechanical and/or optical mice. Typically, a mousepad has a thickness of about five millimeters or less for comfort and ease of mousing.

Like a typical mousepad itself, the mousing veneer 120 offers a textured and/or non-reflective surface for mousing and, overall, the support-surface apparatus 110 is relatively flat for the comfort and ease of mousing. However, unlike a conventional mousepad, the support-surface apparatus 110 includes electro-mechanical components to impart the tactile feedback to the user holding the mouse 130.

Figure 2:
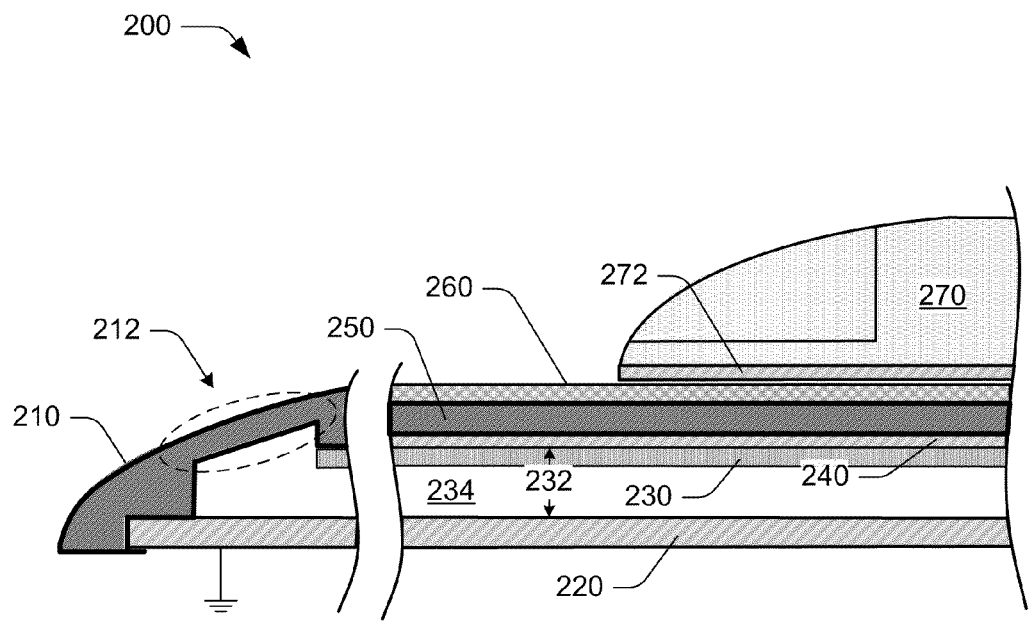
FIG. 2 is a partial cross-sectional view of the first implementation of the tactile-feedback imparting support-surface apparatus.

FIG. 2 shows, in a partial cross-sectional view, an exemplary assembly 200 of an implementation of a tactile-feedback imparting support-surface apparatus, like the support-surface apparatus 110 shown in FIG. 1. While the exemplary assembly 200 is thin and flat (like a conventional mousepad), the overall thickness of the exemplary assembly 200 is exaggerated in FIG. 2 to better illustrate the parts and arrangements of the exemplary assembly.

As depicted here, the exemplary assembly 200 includes a bezel or chassis 210, a grounded actuation plane 220, a dielectric layer 230, a chargeable actuation plane 240, a shield layer 250, and a mousing veneer 260. For context, a mouse 270 is shown resting on the mousing veneer 260.

The chassis 210 forms the structural base for the exemplary assembly 200. Typically, the chassis 210 is formed from solid and rigid material that, if thin enough, will bias when a force is applied but spring back to its original position once the force is removed. Materials may include (but are not limited to) plastics, wood, plant material, magnets, metal, rubber, composite materials (carbon fiber, fiberglass etc), glass and other semi-rigid elastomeric compounds The chassis 210 includes a spring or return mechanism 212, which is shown in a dashed oval in FIG. 2. As will be discussed later, this section of the chassis 210 is designed to flex when a force is applied but spring back to its original position once the force is removed.

An actuation mechanism is formed using a combination of the grounded actuation plane 220, the dielectric layer 230, the chargeable actuation plane 240, and the return mechanism 212. The actuation mechanism holds the two planes (220 and 240) apart with a defined gap 232 therebetween. The actuation of the actuation mechanism occurs when the chargeable actuation plane 240 is charged with a voltage. In response, the charged actuation plane 240 moves rapidly downward because of the high attractive forces between the two planes. This movement biases the return mechanism and closes an air gap 234 between the planes. Once the actuation is released, the biased return mechanism urges the charged actuation plane 240 back to its original position.

Of course, in other implementations, the charged actuation plane 240 may remain stationary during actuation while the grounded actuation plane 220 moves upward. In still other implementations, the arrangement of the grounded and charged actuation planes may be inverted. In these implementations, one of the planes is stationary while the other moves during an actuation. In still further alternative implementations, both planes may be configured to move towards each other during an actuation. In other implementations, it may be release of the charge (and thus the attraction between the planes) that acts as an actuation and causes one or both planes to move relative to the other.

The shield layer 250 insulates the chargeable actuation plane 240 from a user who is presumably touching the mouse 270, which is supported on the mousing veneer 260. Consequently, the shield layer 250 is made from non-conductive (i.e., insulating) material. In some implementations, the shield layer 250 is integral with, and thus part of, the chassis 210. Alternatively, the shield layer 250 may include an additional conductive layer that prevents capacitive coupling to the user or HMI device.

Alternatively or inclusive, the mouse 270 may include plane 272 with conductive properties. By attracting this plane 272 to the chargeable plane 240, the friction between the mouse 270 and the mousing veneer 260 is increased. This, of course, makes it harder for the user to move the mouse 270. Movement resistance of the mouse is a form of tactile-feedback.

This HMI-device movement-resistance employs electrostatics in a manner similar to that described above. In this instance, the mouse plane 272 is grounded and the chargeable plane 240 is, of course, chargeable. The mousing veneer 260 and/or the shield layer acts as a dielectric. This arrangement for HMI-device movement-resistance may be used with or without inclusion of the grounded plane 220.

Figure 3:
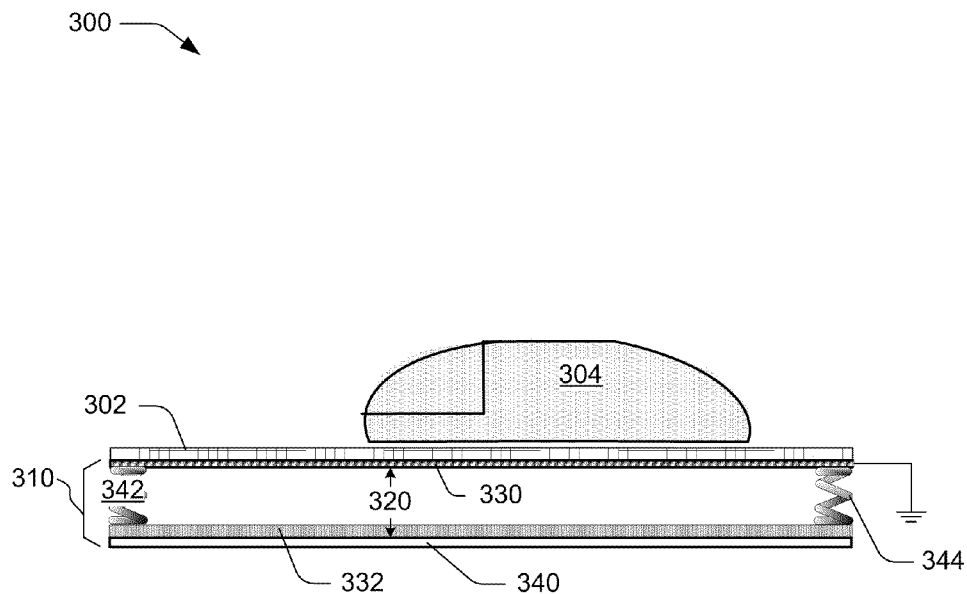
FIG. 3 is a simplified cross-sectional view of a second implementation of a tactile-feedback imparting support-surface apparatus that is configured in accordance with the techniques described herein.

FIG. 3 shows, in a simplified cross-sectional view, an exemplary assembly 300 of another implementation of a tactile-feedback imparting support-surface apparatus. While the exemplary assembly 300 is thin and flat (like a conventional mousepad), the overall thickness of the exemplary assembly 300 is exaggerated in FIG. 3 to better illustrate the parts and arrangements of the exemplary assembly.

As depicted here, the exemplary assembly 300 includes an HMI device support veneer 302 (e.g., a mousing veneer) and an actuation mechanism 310. For context, an HMI device, such as mouse 304, is shown resting on the mousing veneer 302.

The actuation mechanism 310 holds at least a pair of planes in a spaced-apart position relative to each other with a defined gap therebetween. That gap is called the defined actuation gap 320 herein. As depicted, the pair of planes includes a grounded actuation plane 330 and a chargeable actuation plane 340. A dielectric layer 332 is located between the planes. Both planes are conductive (and/or include a conductive layer). As shown here, the grounded actuation plane 330 is grounded.

The actuation mechanism 310 includes a return mechanism (as represented by springs 342 and 344 in FIG. 3) that aids in holding the actuation planes apart and also returns the planes back to their original position after an actuation. The exemplary assembly 300 also performs active tactile feedback to the user touching the mouse 304 supported by the mousing veneer 302.

FIGS. 4-6 offer three different views of another implementation of an exemplary tactile-feedback imparting support-surface apparatus 400. FIG. 4 is an isometric view of the exemplary support-surface apparatus 400. FIG. 5 is top plan view of the support-surface apparatus 400. FIG. 6 is a side elevation view of the support-surface apparatus 400. As depicted in FIGS. 4, 5, and/or 6, the exemplary support-surface apparatus 400 includes a mousing veneer 402, and a housing base 404. Herein, the mousing veneer 402 may also be described as a user-engagement surface configured to support an HMI device. Also, the mousing veneer 402 may be called an HMI-device support surface or the like.

As described herein, the exemplary tactile-feedback imparting support-surface apparatus 400 includes an electromechanical movement-effecting mechanism designed to move an electronically conductive plane using electrostatic forces. This movement is designed to provide active tactile feedback to the user using a HMI device supported by (e.g., engaged with) the mousing veneer 402. Typically, the electronically conductive plane is moved in one or more directions that are towards and/or away from the mousing veneer 402.

Figure 7:
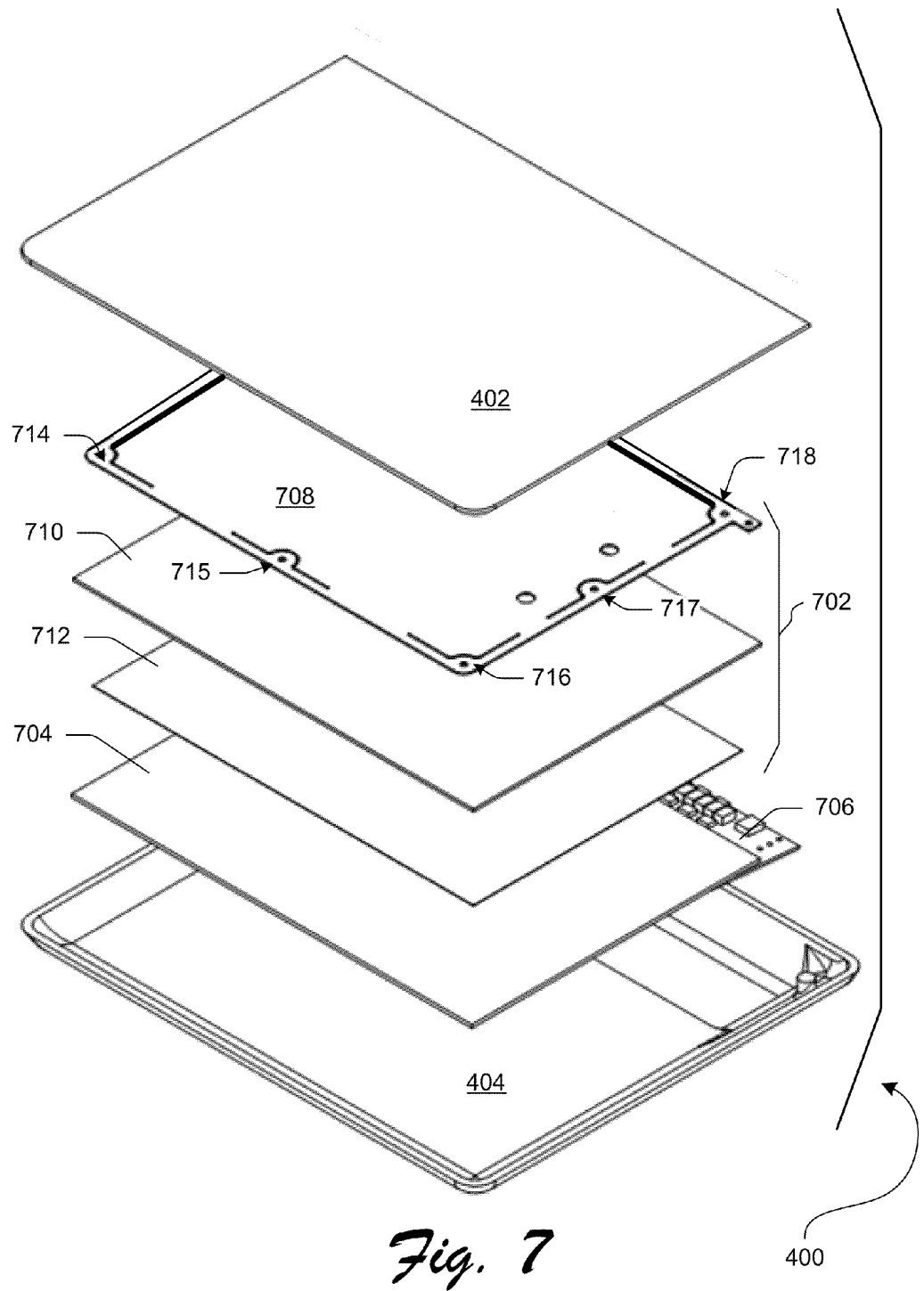
FIG. 7 is an exploded view of the third implementation of the tactile-feedback imparting support-surface apparatus.

FIG. 7 shows an exploded view of an exemplary assembly of the support-surface apparatus 400, which includes the support veneer 402, an actuation mechanism 702, a spacer 704, a controller board 706, and the housing base 404.

The support veneer 402 (i.e., mousing veneer) is a flat and unobstructed surface presented to the user for engagement therewith a HMI device. The spacer 704 is an inert material filling space between the actuation mechanism 702 and the housing base 404. The controller board 706 includes logic to handle and manage various aspects of the support-surface apparatus 400 functionality, such as driving the actuation mechanism 702.

The actuation mechanism 702 provides the active tactile feedback (i.e., haptics) to the user. The actuation mechanism 702 includes an upper actuation plane 708, a return mechanism, a dielectric layer 710, and a lower actuation plane 712. The actuation mechanism 702 holds at least a pair of electrically conductive planes (e.g., upper actuation plane 708 and lower actuation plane 712) in a spaced-apart position with a defined gap therebetween. As depicted herein, the upper actuation plane 708 is an electrically conductive plate of sheet metal and the lower actuation plane 712 is an electrically conductive film adhered to the spacer 704. Of course, other implementations may arrange the planes differently. For example, the lower actuation plane 712 may be adhered directly to the base for those assemblies without a spacer.

As shown in FIG. 7, the return mechanism is represented herein by leaf springs 714, 715, 716, 717, 718 that are built into the upper actuation plane 708. The return mechanism is operably associated with (e.g., integrated with, connected to, or coupled to) at least one of the pair of actuation planes (e.g., upper actuation plane 708 and lower actuation plane 712). The return mechanism is designed to return the pair of planes, after a movement of the planes relative to each other, back to the spaced-apart position relative to each other and restore the defined gap therebetween. That is, the return mechanism restores the defined gap between the actuation planes.

The leaf springs (e.g., 714, 715, 716, 717, 718) are integrated into the perimeter of the upper actuation plane 708. In this embodiment, the upper actuation plane 708 with integrated leaf springs may also be called a "spring plate." Each of the leaf springs (e.g., 714, 715, 716, 717, 718) has a hole with which the upper actuation plane 708 is rigidly mounted to the housing base 404 (directly or indirectly). In doing this, the interior of the upper actuation plane 708 may move up and down while the leaf springs remain affixed and unmoving.

While not shown, the support-surface apparatus 400 also includes a return stop that is firmly attached to the housing/chassis and is designed to stop the upward movement of the upper actuation plane 708 on its return from actuation. That upward movement is typically caused by the return mechanism urging the upper actuation plane back to its original position after actuation is released.

Components of an Exemplary Support-Surface Apparatus

Figure 8:
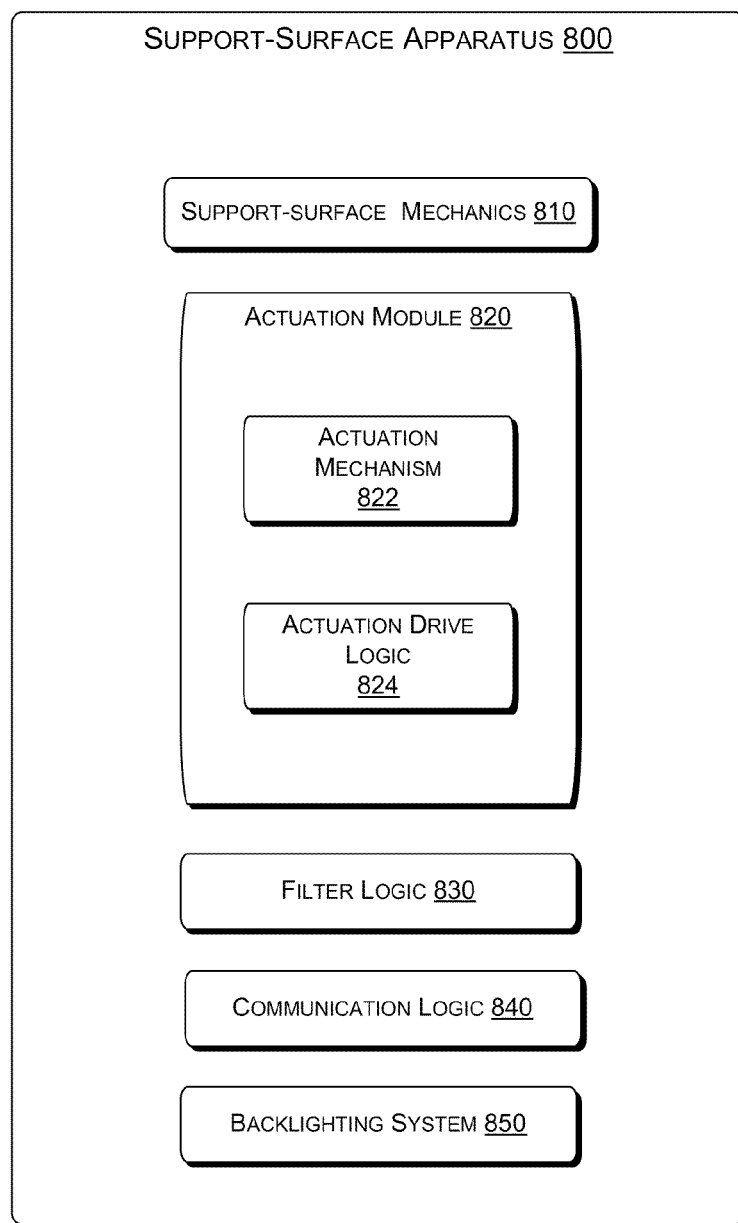
FIG. 8 is a block diagram of components of a fourth implementation of a tactile-feedback imparting support-surface apparatus that is configured in accordance with the techniques described herein.

FIG. 8 illustrates some exemplary components in accordance with one or more embodiments of the tactile-feedback imparting support surface technology described herein, such as an exemplary tactile-feedback imparting support-surface apparatus 800. The exemplary support-surface apparatus 800 includes support-surface mechanics 810, a tactile-feedback actuation module 820, filter logic 830, a communication module 840, and a backlighting system 850.

The support-surface mechanics 810 include the mechanical components of the exemplary support-surface apparatus 800 that are not part of the other components described as part of this exemplary support surface. For example, such components may include (but are not limited to): a housing and a support veneer.

The tactile-feedback actuation module 820 includes an actuation mechanism 822 and actuation drive logic 824. The actuation drive mechanism 820 corresponds, in this example, to the actuation mechanisms depicted in FIGS. 2, 3, and 7. In response to the appropriate signals from a host computer (such as the computing system 140 depicted in FIG. 1), the actuation drive logic 824 fires the actuation mechanism 822 with the appropriate timing and characteristics. The actuation drive logic 824 is designed to drive the actuation planes, which have conductive properties, with an electrical signal to cause the movement of at least one of the planes relative to the other of the planes effective to provide tactile feedback to the user.

In addition, the actuation drive logic 824 is designed to compress the material between the mouse and the actuation mechanism by attracting the mouse's plane (such as plane 272 shown in FIG. 2) towards one or more of the pair of planes of the actuation mechanism (e.g., chargeable plane 240) while the mouse is supported by the support veneer. The material being compressed may include, for example, the support veneer and the shield layer (such as veneer 260 and layer 250 of FIG. 2). The actuation drive logic 824 drives the attraction by an electrical signal.

The filter logic 830 may include audio signal modifying components. An audio signal obtained from the host computer may be modified by the filter logic 830. The modification may include a filter to select one or more defined bands of frequencies. Such filters may include low-pass, high-pass, or bandpass filters.

In alternative implementations where the mousepad is driven by specific commands rather than audio, the filter logic 830 may be a command interpreter. In those situations, the command interpreter understands the specific commands in the signal and drives the actuation drive logic to actuation accordingly.

The communications logic 840 is operatively connected to the host computer. That connection may be wired or wireless. The communications logic 840 receives signals from the host computer that are intended to drive the tactile feedback of the active-feedback actuation module 820. In some implementations, the communications logic 840 may be combined with the filter logic 830 and/or the actuation drive logic 824.

The backlighting system 850 includes one or more lighting elements that are positioned so that a user, through a transparent and/or translucent support veneer, can see the light. In some implementations, the backlighting system 850 is configured to send light around the support veneer. In some implementations, the backlighting system 850 may be designed to light specific areas of the support veneer. The backlighting system 850 employs Light Emitting Diodes (LEDs), diffusers, and/or other conventional and new lighting elements.

Any suitable hardware, software, and/or firmware can be used to implement the actuation drive logic 824, filter logic 830, and the communication module 840.

Exemplary Process

Figure 9:
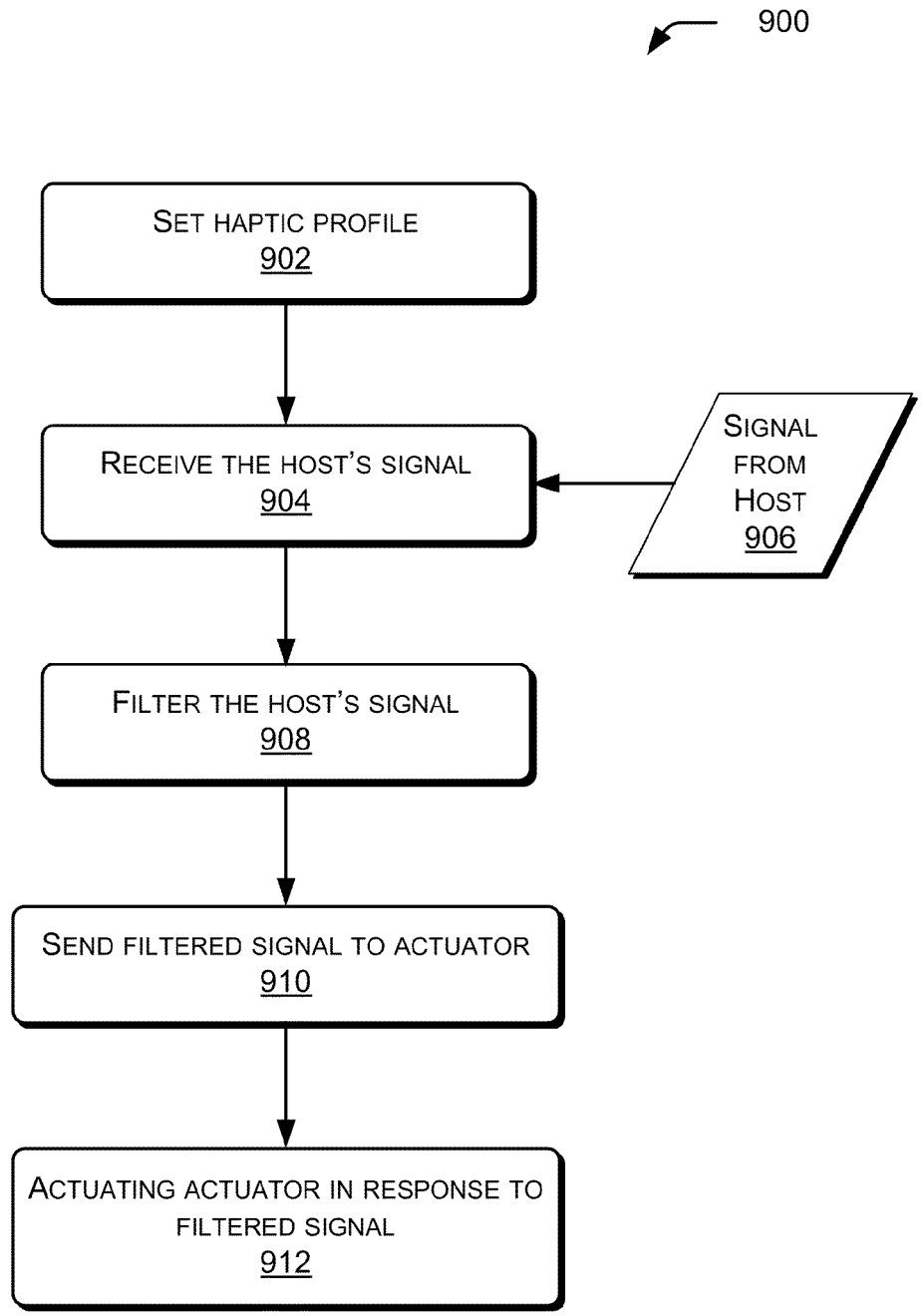
FIG. 9 is a flow diagram of one or more exemplary processes, each of which implements the techniques described herein.

FIG. 9 is a flow diagram illustrating exemplary process 900 that implements the techniques described herein for the new tactile-feedback support surface technology. The process 900 is performed, at least in part, by a support-surface apparatus, such as the mousepads shown in FIGS. 1-8 and described herein.

As shown here, the process 900 begins with operation 902, where a haptic profile is set for the mousepad. This profile sets various parameters that define how and when the actuation mechanism is fired. The parameters in the haptic profiles can include (by way of example and not limitation): value of a single voltage pulse; a series of values of voltage pulses having various frequencies and amplitudes; and the like.

Next, at operation 904, the mousepad receives the audio signal 906 from the host computing system. This signal may be the general audio produced by the computing system (regardless of source within the computing system). Alternatively, the signal may come from one or more particular sources, such as computer game that the user is playing at the time. Alternatively still, the signal may be a particular audio channel that was programmed specifically to drive the mousepad.

Next, at operation 908, the mousepad filters the host's audio signal to produce a filtered signal that includes particular bands or ranges of sound frequencies. For example, everything but the lower frequencies may be filtered out so that user feels a tactile feedback that coincides with the bass portion of the game's audio track. If the mousepad receives a specifically programmed audio channel, then operation 908 may be skipped.

Alternatively, the filtering may be performed by the host and the host may deliver the filtered signal to the mousepad. For example, a software application may run in the background of the host computer that takes the audio channel and extracts the appropriate content (e.g., via filtering). This could be configurable (e.g., through a control panel) to select which frequencies are relevant.

In addition, the mousepad and/or the host may be configured to trigger an actuation based upon specific events occurring. For example, when the user presses a certain key (such as firing a weapon of a game) or moves the mouse in a specified region.

At operation 910, the mousepad sends the filtered signal to the actuator (i.e., actuation mechanism) to drive the tactile feedback of the mousepad.

At operation 912, the actuation mechanism is triggered in response to filtered signals sent by operation 910. When triggering the actuation mechanism, many different factors are affected by the haptic profile. Examples of such factors include (but are not limited to): amount of voltage, rate of application of that voltage, how long the actuation is held, when the actuation is released, the rate of the release of the actuation voltage, etc.

The process 900 continues as long as the mousepad is active and in use. A particular haptic profile may be set at any time without halting process 900.

Figure 10:
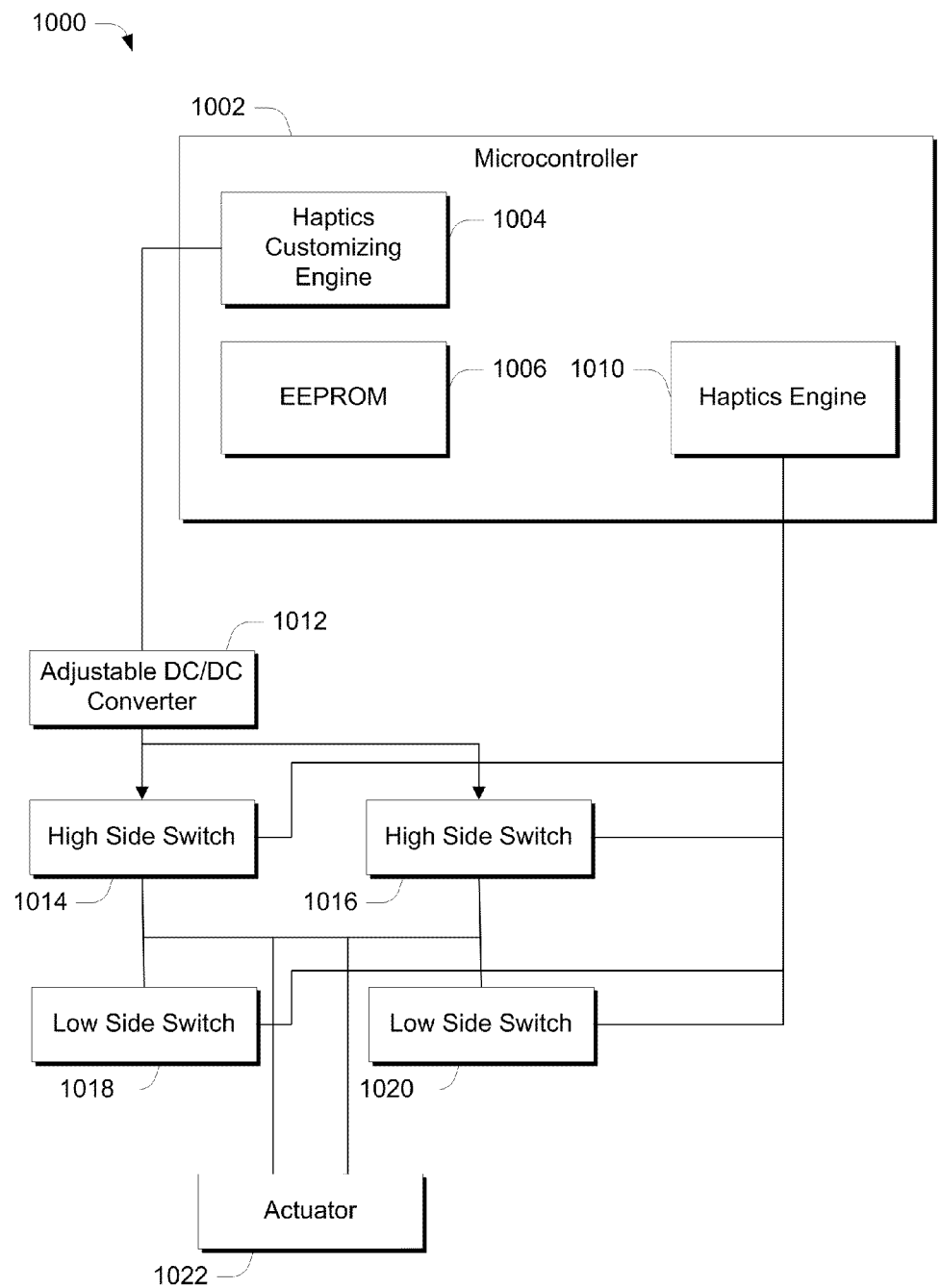
FIG. 10 illustrates a high-level block diagram of at least part of an exemplary system in accordance with one or more embodiments.

The operations of the exemplary tactile-feedback imparting support-surface apparatus (e.g., as illustrated in FIG. 9) can be implemented in connection with any suitable hardware, software, firmware, or combination thereof. For example, consider FIG. 10, which illustrates a high-level block diagram of a system that can be incorporated into a device and utilized to implement the functionality described herein. In the illustrated and described example, system 1000 includes a microcontroller 1002, which, in turn, includes a haptics customizing engine 1004, a computer-readable storage media in the form of an EEPROM 1006, and a haptics engine 1010. In addition, system 1000 includes an adjustable DC/DC converter 1012, high side switches 1014, 1016, low side switches 1018, 1020, and an actuator 1022. The various components of system 1000 can be configured in any suitable manner in order to provide haptic feedback as described herein.

Exemplary Computing System and Environment

Figure 11:
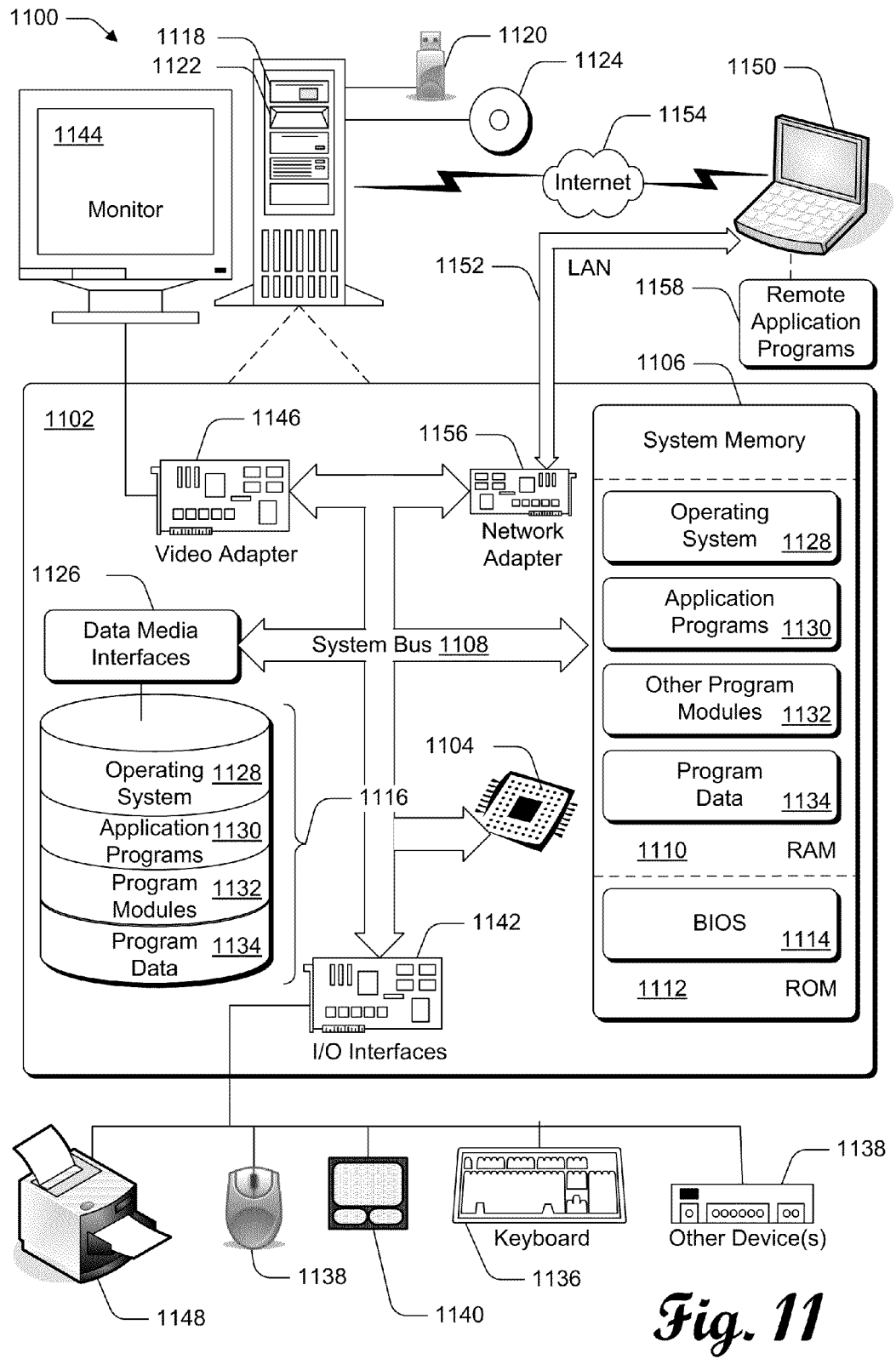
FIG. 11 illustrates an exemplary computing environment suitable for one or more implementations of the techniques described herein.

FIG. 11 illustrates an example of a suitable computing environment 1100 within which one or more implementations, as described herein, may be implemented (either fully or partially). The exemplary computing environment 1100 is only one example of a computing environment and is not intended to suggest any limitation as to the scope of use or functionality of the computer and network architectures. Neither should the computing environment 1100 be interpreted as having any dependency or requirement relating to any one or combination of components illustrated in the exemplary computing environment 1100.

The one or more implementations, as described herein, may be described in the general context of processor-executable instructions, such as program modules, being executed by a processor. Generally, program modules include routines, programs, objects, components, data structures, etc. that perform particular tasks or implement particular abstract data types.

The computing environment 1100 includes a general-purpose computing device in the form of a computer 1102. The components of computer 1102 may include, but are not limited to, one or more processors or processing units 1104, a system memory 1106, and a system bus 1108 that couples various system components, including the processor 1104, to the system memory 1106.

The system bus 1108 represents one or more of any of several types of bus structures, including a memory bus or memory controller, a peripheral bus, an accelerated graphics port, and a processor or local bus using any of a variety of bus architectures.

Computer 1102 typically includes a variety of processor-readable media. Such media may be any available media that is accessible by computer 1102 and includes both volatile and non-volatile media, removable and non-removable media.

The system memory 1106 includes processor-readable media in the form of volatile memory, such as random access memory (RAM) 1110, and/or non-volatile memory, such as read only memory (ROM) 1112. A basic input/output system (BIOS) 1114, containing the basic routines that help to transfer information between elements within computer 1102, such as during start-up, is stored in ROM 1112. RAM 1110 typically contains data and/or program modules that are immediately accessible to and/or presently operated on by the processing unit 1104.

Computer 1102 may also include other removable/non-removable, volatile/non-volatile computer storage media. By way of example, FIG. 11 illustrates a hard disk drive 1116 for reading from and writing to a non-removable, non-volatile magnetic media (not shown), a magnetic disk drive 1118 for reading from and writing to a removable, non-volatile flash memory data storage device 1120 (e.g., a "flash drive"), and an optical disk drive 1122 for reading from and/or writing to a removable, non-volatile optical disk 1124 such as a CD-ROM, DVD-ROM, or other optical media. The hard disk drive 1116, flash drive 1118, and optical disk drive 1122 are each connected to the system bus 1108 by one or more data media interfaces 1126. Alternatively, the hard disk drive 1116, magnetic disk drive 1118, and optical disk drive 1122 may be connected to the system bus 1108 by one or more interfaces (not shown).

The drives and their associated processor-readable media provide non-volatile storage of processor-readable instructions, data structures, program modules, and other data for computer 1102. Although the example illustrates a hard disk 1116, a removable magnetic disk 1120, and a removable optical disk 1124, it is to be appreciated that other types of processor-readable media, which may store data that is accessible by a computer, such as magnetic cassettes or other magnetic storage devices, flash memory cards, floppy disks, compact disk (CD), digital versatile disks (DVD) or other optical storage, random access memories (RAM), read only memories (ROM), electrically erasable programmable read-only memory (EEPROM), and the like, may also be utilized to implement the exemplary computing system and environment.

Any number of program modules may be stored on the hard disk 1116, magnetic disk 1120, optical disk 1124, ROM 1112, and/or RAM 1110, including, by way of example, an operating system 1128, one or more application programs 1130, other program modules 1132, and program data 1134.

A user may enter commands and information into computer 1102 via input devices such as a keyboard 1136 and one or more pointing devices, such as mouse 1138 or touchpad 1140. Other input devices 1138 (not shown specifically) may include a microphone, joystick, game pad, camera, serial port, scanner, and/or the like. These and other input devices are connected to the processing unit 1104 via input/output interfaces 1142 that are coupled to the system bus 1108, but may be connected by other interfaces and bus structures, such as a parallel port, game port, universal serial bus (USB), or a wireless connection such as Bluetooth.

A monitor 1144 or other type of display device may also be connected to the system bus 1108 via an interface, such as a video adapter 1146. In addition to the monitor 1144, other output peripheral devices may include components, such as speakers (not shown) and a printer 1148, which may be connected to computer 1102 via the input/output interfaces 1142.

Computer 1102 may operate in a networked environment using logical connections to one or more remote computers, such as a remote computing device 1150. By way of example, the remote computing device 1150 may be a personal computer, portable computer, a server, a router, a network computer, a peer device or other common network node, and the like. The remote computing device 1150 is illustrated as a portable computer that may include many or all of the elements and features described herein, relative to computer 1102. Similarly, the remote computing device 1150 may have remote application programs 1158 running thereon.

Logical connections between computer 1102 and the remote computer 1150 are depicted as a local area network (LAN) 1152 and a general wide area network (WAN) 1154. Such networking environments are commonplace in offices, enterprise-wide computer networks, intranets, and the Internet.

When implemented in a LAN networking environment, the computer 1102 is connected to a wired or wireless local network 1152 via a network interface or adapter 1156. When implemented in a WAN networking environment, the computer 1102 typically includes some means for establishing communications over the wide network 1154. It is to be appreciated that the illustrated network connections are exemplary and that other means of establishing communication link(s) between the computers 1102 and 1150 may be employed.

In a networked environment, such as that illustrated with computing environment 1100, program modules depicted relative to the computer 1102, or portions thereof, may be stored in a remote memory storage device.

Additional and Alternative Implementation Notes

A mousepad is the focus of the discussions herein of one or more of the implementations. Naturally, a mouse is the focus of the discussions herein of one or more HMI devices used with such implementations. However, other implementations may be employed that are outside the context of a mousepad and a mouse. Indeed, a suitable implementation may include any flat form factor that can 1) support an HMI device while it is being used and 2) can have suitable electo-mechanical tactile-feedback components included or attached.

Examples of suitable form factors include (by way of illustration and not limitation) mousepad, cooling pad, lapdesk, drawing pad, table, notepad, graphics tablet, writing pad, desk, and the like. Examples of HMI devices that may be supported by an exemplary support-surface apparatus include (by way of illustration and not limitation) keyboard, key pad, pointing device, mouse, trackball, touchpad, joystick, pointing stick, game controller, gamepad, paddle, pen, stylus, touchscreen, tablet computer, mobile phone, smartphone, laptop computer, netbook computer, foot mouse, steering wheel, jog dial, yoke, directional pad, and dance pad.

In some implementations, the support veneer of the exemplary support-surface apparatuses may be opaque. In other implementations, the support veneer of the exemplary support-surface apparatuses may be translucent or transparent.

References herein to audio signals refer to the electrical signals that represents audio signals rather than to the actual sound waves.

The implementations of a tactile-feedback support-surface apparatus, depicted herein, are stand-alone devices rather than integrated with a computer. Of course, alternative implementations may have a support surface integrated within the housing or chassis of the computer or other device.

The following U.S. patent applications are incorporated by reference herein:

U.S. patent application Ser. No. 12/580,002, filed on Oct. 15, 2009;
U.S. Provisional Patent Application Ser. No. 61/347,768, filed on May 24, 2010;
U.S. Provisional Patent Application Ser. No. 61/410,891, filed on Nov. 6, 2010;
U.S. patent application Ser. No. 12/975,733, filed on Dec. 22, 2010; and
U.S. Provisional Patent Application Ser. No. 61/429,749, filed on Jan. 4, 2011.

The actuation mechanism (such as actuation mechanisms 310 and 702) is described herein as producing a movement to effect a tactile feedback to a user by using electrostatic forces to attract a pair of conductive planes. In alternative embodiments, the movement may be caused by other types of electro-mechanical actuators, which include (but are not limited to) those based upon: electroactive polymers (EAP), piezoelectric, solenoids, and the like.

One or more of the implementations described herein are described as having the support surface (such as support veneer 120) move as part of the actuation. That is, for the described implementations the support surface presented to support the HMI-device moves in direct response to the actuation of a plane operatively connected thereto. Alternatively or additionally, the actuation may move one or more other planes of the mousepad in such a manner as the HMI-device user may feel. For example, an internally located plane may actuate without directly moving the support surface, but yet the HMI-device user may feel that the actuation movement.

The actuation mechanism (such as actuation mechanisms 310 and 702) is described herein as having a pair of actuation planes (such as 708 and 712). Alternative assemblies of the tactile-feedback support-surface apparatus may include more than just the pair of planes. Those alternative assemblies may include a defined gap between each pair of stacked-up and spaced-apart planes. This effectively creates a layered stack of multiple actuation mechanisms.

Depending upon the particular implementation, each of the actuation planes (such as 708 and 712) may also be described, in whole or in part, as a layer, plate, stratum, substrate, laminate, sheet, film, coating, page, blanket, strip, expanse, foil, leaf, membrane, pane, panel, ply, slab, veneer, or the like.

Some of the actuation planes (such as 708 and 712) depicted herein are shown as a single stratum of material. However, other embodiments may use multiple strata of material to form an actuation plane. For example, some embodiments may use two, three, four, or more layers of material. Regardless of the number of layers used for each plane, one or more layers have conductive properties for electrostatic actuation purposes.

For example, in at least some embodiments, each of the actuation planes (such as 708 and 712) may be formed from or include an electrically conductive material. Examples of conductive material that the planes may include or be formed from include (but are not limited to): silver, iron, aluminum, gold, brass, rhodium, iridium, steel, platinum, tin, indium tin oxide, titanium, copper, or some other sheet metal. The planes may be transparent and/or translucent. In that case, the planes may be, for example, glass or plastic and may have an electrically conductive coating or film (such as a layer of indium-tin-oxide). Other materials can, of course, be utilized without departing from the spirit and scope of the claimed subject matter.

As depicted herein, the actuation mechanism (such as actuation mechanisms 310 and 702) moves at least one of the pair of the actuation planes (such as 708 and 712) up/down and the return mechanism moves the plane(s) in the opposite direction when actuation is deactivated. This movement can be described as being substantially normal to and/or from the support surface (such as mousing veneer 120). Alternatively, this movement can be described as being parallel with the movement of the Z-direction of the support surface.

Dielectric material (such as dielectric layer 710) can include any suitable type of dielectric material such as (by way of example and not limitation): air, glass, ceramic, mica, piezo materials, FR4, plastic, paper, elastomeric material, gel and/or other fluidic or non-fluidic material. Although it is not technically a material, a vacuum may operate as an effective dielectric for some implementations. Alternately or additionally, in at least some embodiments, the return mechanism (as represented by area 212 and springs 342, 344) can be formed from any suitable material, such as plastic, thermoplastic elastomer, metal, and the like.

While depicted herein (e.g., FIG. 7) as leaf springs and in other drawings as other types of springs, the return mechanism may be and/or may include a variety of functional components. The return mechanism is described in additional detail in U.S. patent application Ser. No. 12/975,733 and in U.S. Provisional Patent Application Ser. No. 61/410,891, both of which are incorporated herein by reference.

It is to be appreciated and understood that other types of return mechanisms can be utilized without departing from the spirit and scope of the claimed subject matter. For example, alternative return mechanisms might restore the gap between the planes without biasing or spring forces. This returning action may be accomplished via repulsion, attraction, or other magnetic or electromagnetic forces. Also, other mechanical actions may restore the gap between the planes.

In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations.

The inventors intend the described exemplary implementations to be primarily examples. The inventors do not intend these exemplary implementations to limit the scope of the appended claims. Rather, the inventors have contemplated that the claimed invention might also be embodied and implemented in other ways, in conjunction with other present or future technologies.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts and techniques in a concrete fashion. The term "techniques," for instance, may refer to one or more devices, apparatuses, systems, methods, articles of manufacture, and/or computer-readable instructions as indicated by the context described herein.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

These processes are illustrated as a collection of blocks in a logical flow graph, which represents a sequence of operations that can be implemented in mechanics alone or a combination with hardware, software, and/or firmware. In the context of software/firmware, the blocks represent instructions stored on one or more computer-readable storage media that, when executed by one or more processors, perform the recited operations.

Note that the order in which the processes are described is not intended to be construed as a limitation, and any number of the described process blocks can be combined in any order to implement the processes or an alternate process. Additionally, individual blocks may be deleted from the processes without departing from the spirit and scope of the subject matter described herein.

The term "processor-readable media" includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

What is claimed is:

1. A tactile-feedback imparting mousepad comprising:
   a support surface presented to support a mouse for mousing thereon by a user, the mouse having a plane with conductive properties; and
   a tactile-feedback actuation mechanism operably associated with the support surface, the actuation mechanism including:
      a pair of planes, which have conductive properties, held in a spaced-apart position relative to each other and with a defined gap therebetween, wherein at least one of the pair of planes is operatively associated with the support surface, the actuation mechanism being configured to permit at least one of the planes to move relative to the other effective to provide tactile feedback to the user via the support surface and through the mouse while the user is engaged with the mouse;
      a return mechanism operably associated with at least one of the pair of planes, the return mechanism being configured to return the pair of planes, after a movement of the planes relative to each other, back to the spaced-apart position relative to each other and restore the defined gap therebetween; and
   drive logic operably connected to the actuation mechanism and configured to drive the planes with an electrical signal to cause a permitted movement of at least one of the planes relative to the other of the planes effective to provide tactile feedback to the to the user via the support surface and through the mouse while the user is engaged with the mouse;
   wherein the drive logic is further configured to compress the support surface between the mouse and actuation mechanism by attracting the mouse's plane towards one or more of the pair of planes of the actuation mechanism while the mouse is supported by the support surface, the attraction being driven by the electrical signal of the drive logic.

2. A mousepad as recited in claim 1, wherein the user receives an effective tactile feedback via the support surface and through the mouse while the user is engaged with the mouse by the movement of at least one of the planes relative to the other of the plane.

3. A mousepad as recited in claim 1, further comprising communications logic configured to receive an audio signal from a host computing system.

4. A tactile-feedback apparatus comprising:
   a chassis;
   a mousepad as recited in claim 1 supported by the chassis.

5. A tactile-feedback apparatus as recited in claim 4, wherein the return mechanism is integral with the chassis.

6. An apparatus comprising:
   a support surface;
   a mouse supported by the support surface, the mouse having a plane with conductive properties; and
   a tactile-feedback actuation mechanism operably associated with the support surface, the actuation mechanism configured to provide tactile feedback to a user via the support surface while the user is engaged with the mouse the actuation mechanism being configured to provide tactile feedback by increasing the mouse's resistance to planar movement over the support surface by attracting the conductive plane of the mouse toward the tactile-feedback actuation mechanism through the support surface via electrostatic forces.

7. An apparatus as recited in claim 6, further comprising:
   communications logic configured to receive an audio signal from a host computing system;
   drive logic operably connected to the communications logic and the actuation mechanism, the drive logic being configured to drive tactile feedback imparted by the actuation mechanism based upon at least part on the audio signal received from the host computing device.

8. An apparatus as recited in claim 6, further comprising:
communications logic configured to receive an audio signal from a host computing system;
filter logic operably connected to the communications logic and configured to filter the audio signal to produce a filtered signal comprising one or more bands selected from the received audio signal;
drive logic operably connected to the filter logic and the actuation mechanism, the drive logic being configured to drive tactile feedback imparted by the actuation mechanism based upon at least part on the filtered signal.

9. An apparatus as recited in claim 6, further comprising a backlighting system configured to transmit light through and/or around the support surface.

10. An apparatus as recited in claim 6, wherein the tactile-feedback actuation mechanism includes:
a pair of planes with conductive properties, the pair of planes being held in a spaced-apart position relative to each other and with a defined gap therebetween;
a return mechanism operably associated with at least one of the pair of planes, the actuation mechanism being configured to move, when activated, at least one of the planes relative to the other of the plane effective to provide tactile feedback to the user using the mouse on the support surface and the return mechanism being configured to return the pair of planes, after the movement, back to the spaced-apart position relative to each other and restore the defined gap therebetween.

11. An apparatus as recited in claim 10, further comprising drive logic operably connected to the actuation mechanism and configured to drive the planes with an electrical signal to cause a permitted movement of at least one of the planes relative to the other of the plane effective to provide tactile feedback to the to the user via the support surface and through the mouse while the user is engaged with the mouse.

12. An apparatus as recited in claim 10, wherein the user receives an effective tactile feedback via the support surface and through the mouse while the user is engaged with the mouse by the movement of at least one of the planes relative to the other of the plane.

13. An apparatus as recited in claim 10, further comprising a dielectric material interposed between the planes.

14. An apparatus as recited in claim 10, wherein the actuator mechanism is further configured to permit movement of the user-engagement surface—via the actuator mechanism's operable association with the surface—in directions out from a plane of the surface.

15. An apparatus comprising:
a support surface;
a mouse supported by the support surface, the mouse having a plane with conductive properties;
a tactile-feedback actuation mechanism operably associated with the support surface, the actuation mechanism configured to provide tactile feedback to a user via the support surface while the user is engaged with the actuation mechanism including a plane with conductive properties, the plane of the mouse and the actuation plane being separated by the support surface therebetween;
the actuation mechanism being configured to attract, when activated, via electrostatic forces the two planes together effective to provide tactile feedback to the user by increasing the mouse's resistance to planar movement over the support surface.

* * * * *